April 15, 1930.  F. BEHRENDT  1,754,540
VISION ATTACHMENT
Filed Feb. 21, 1927
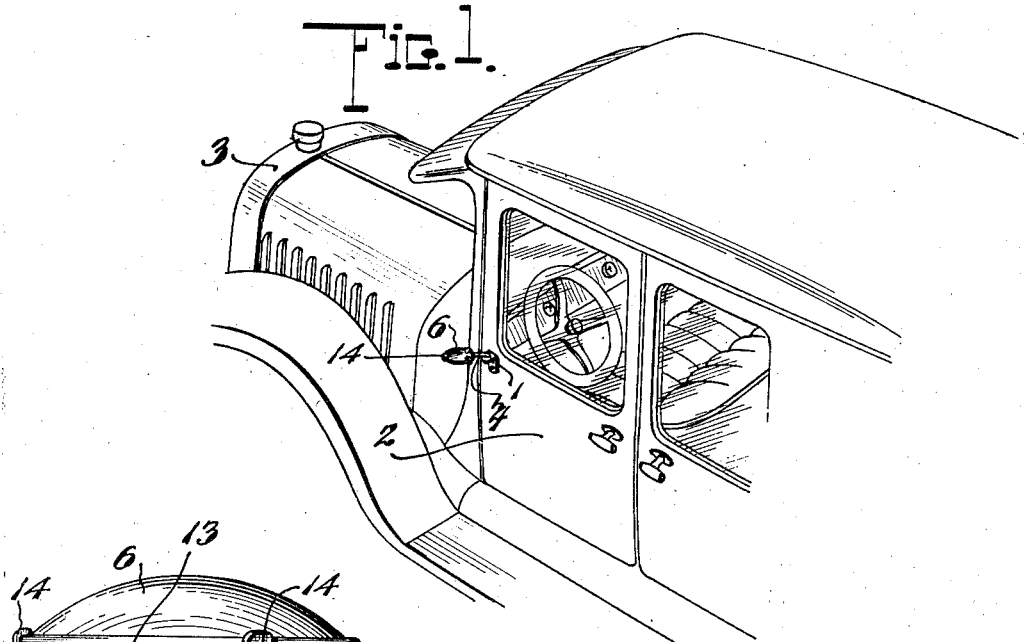
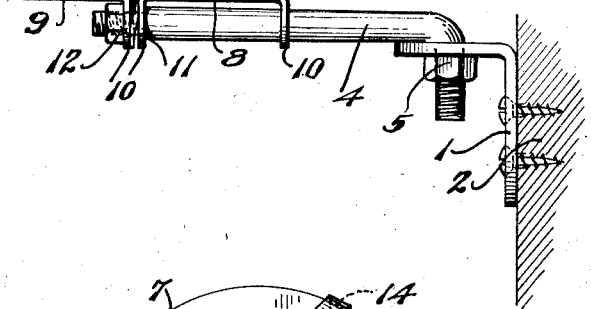
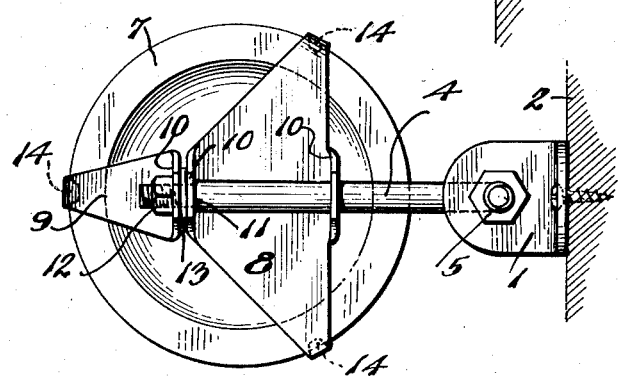
Inventor
F. Behrendt Patented Apr. 15, 1930

1,754,540

UNITED STATES PATENT OFFICE

FREDERICK BEHRENDT, OF CLEVELAND, OHIO

VISION ATTACHMENT

Application filed February 21, 1927. Serial No. 169,959.

This invention relates to improvement in vision facilitation and enlargement attachments for vehicles, and has as its primary object facilitating the easy observation by the operator of a vehicle of conditions otherwise obscure or difficult to see.

A more detailed object is the disclosure to the operator of the vehicle, without necessitating alteration in his position, of the facts regarding signal lights or other signal conditions, even when such signal apparatus is out of the ordinary range of observation as when located above and too near the vehicle to be seen by the operator.

With these and further objects in view, the invention comprises a reflector located and contoured to afford a wide range of observation including wide angularity thereof.

The invention also comprises certain other novel constructions, combinations, and arrangements of parts as will be hereinafter specified and claimed.

In the accompanying drawing—

Fig. 1 is a fragmentary perspective view on a reduced scale of a vehicle equipped with an embodiment of the present invention.

Fig. 2 is an enlarged, detailed, edge view of an embodiment of the invention, a part of the vehicle being indicated in section.

Fig. 3 is an inverted plan thereof.

Referring to the drawing by numerals, 1 indicates a bracket anchored to the wall 2 of an automobile or other vehicle 3. The wall 2 is preferably some part of the automobile body adjacent to the seat of the operator or driver, and may be a part of the entrance door or one of the front uprights for the windshield or otherwise, it being of primary importance that the present improved attachment be properly located both for the observation by the vehicle operator and for assuming the required angular relation to the area to be envisioned. Pivotally engaging the outstanding arm of the bracket 1 is a rod 4, which is preferably extended at right angle or approximately at right angle to that portion of itself which projects through the outstanding arm of the bracket 1. The part of the arm 4 which extends through the bracket 1 is preferably threaded and provided with a clamping nut 5 disposed to clamp the rod 4 firmly against the engaged arm of the bracket 1 for retaining the rod in any given adjusted position. Adjustably, but preferably rigidly, mounted on the rod 4 is a reflecting device 6 having a convex reflecting surface adapted to be so located as to envision a maximum area from a given point of observation. The contour of the reflecting surface 6 is such that the periscopic observation afforded is comparable with the image thrown by a wide angle lens, so that by proper adjustment of reflecting surface 6, (the adjustment having once been determined remains substantially constant) the driver or operator of the vehicle can readily see signal light conditions, even though such lights may be almost immediately overhead or considerably at one side or substantially in advance, and observation may be made without any change whatever in the position or posture of the operator.

The manner of the mounting of the reflector 6 and the character of the material of such reflector are susceptible of very substantial variations. As a matter of expediency, convenience and inexpensiveness of construction, the said reflector may be a mirror produced on a lens-like casting of glass, and the reflector is preferably marginally circular as seen at 7 in Fig. 3. The body of the reflector 6 may be engaged for adjustable connection to rod 4 by various forms of apparatus, one of which consists of an adjustable tripod of triangular plate sections seen best in the inverted plan in Fig. 3. The said plate sections preferably consist of a main plate section 8 and a supplemental plate section 9. The terminal points or angles of the plate sections 8 and 9 outstanding beyond the circular marginal portion 7 are folded about the marginal portion to provide clamping tabs 14. Each of the plate sections 8 and 9 is provided with downwardly bent or extended eyes 10 snugly surrounding the rod 4. Plate section 8 is probably provided with two of the eyes 10 while plate section 9 may be provided only with a single eye. The rod 4, near its outer end, is formed with an annular shoulder 11, and from the shoulder 11 to its outer end the rod is threaded and the threaded portion engaged by a nut 12. The eye 10 of the plate 9 and the outer eye 10 of the plate 8 are of slightly less diameter than the diameter of the main body of rod 4, so as to be susceptible of being clamped by the nut 12 against the shoulder 11. A locking washer 13 is preferably disposed between the said last named eyes 10, so that, when the nut 12 is threaded tightly against the eye 10 of the plate 9, the plates 8 and 9 are thereby firmly clamped in the given position on the rod 4. The nut 12 may be left sufficiently loose to allow the reflector 6 and plates 8 and 9 to be rotated about the rod 4 under substantial, frictional resistance, so that the reflector 6 may be adjusted angularly and vertically to the exact location best adapted to the needs of the driver for disclosing such area as he desires to observe. Obviously adjustment of rod 4 about its pivotal engagement with bracket 1 may be likewise accomplished.

The use of the instrument will be readily understood without detailed description, and consists generally of the mere observation of the mirror by the operator at such times as he requires information of signal conditions or other matter not within his easy and ready range directly in advance of him.

What is claimed is—

A vision facilitating attachment for vehicle comprising a reflector, plates having tabs clamping the reflector, said plates having upstanding eyes, a supporting rod extending through said eyes and having a shoulder engaging one of the eyes, means for clamping the plates together and to the rod against said shoulder for retaining the reflector on the rod and one of said plates being provided with a supplemental eye embracing said rod.

In testimony whereof I affix my signature.

FREDERICK BEHRENDT.